United States Patent
Ruffino et al.

(10) Patent No.: US 10,612,493 B2
(45) Date of Patent: Apr. 7, 2020

(54) ORIENTABLE ROCKET-MOTOR SYSTEM

(71) Applicant: AIRBUS DEFENCE AND SPACE SAS, Les Mureaux (FR)

(72) Inventors: Fabrice Ruffino, Triel sur Seine (FR); Benjamin Faure, Le Bouscat (FR)

(73) Assignee: ArianeGroup SAS, Paris (FR)

( * ) Notice: Subject to any disclaimer, the term of this patent is extended or adjusted under 35 U.S.C. 154(b) by 1092 days.

(21) Appl. No.: 14/786,143

(22) PCT Filed: Apr. 22, 2014

(86) PCT No.: PCT/FR2014/000089
§ 371 (c)(1),
(2) Date: Oct. 21, 2015

(87) PCT Pub. No.: WO2014/174163
PCT Pub. Date: Oct. 30, 2014

(65) Prior Publication Data
US 2016/0069299 A1    Mar. 10, 2016

(30) Foreign Application Priority Data

Apr. 23, 2013    (FR) ..................................... 13 53684

(51) Int. Cl.
*F02K 9/84*    (2006.01)
*F02K 9/56*    (2006.01)
*F02K 9/80*    (2006.01)

(52) U.S. Cl.
CPC .................. *F02K 9/84* (2013.01); *F02K 9/56* (2013.01); *F02K 9/805* (2013.01); *F05B 2240/9121* (2013.01); *F05B 2250/43* (2013.01)

(58) Field of Classification Search
CPC ... F02K 9/80; F02K 9/84; F02K 9/805; F05B 2240/9121; F05B 2250/42
See application file for complete search history.

(56) References Cited

U.S. PATENT DOCUMENTS

| | | | | |
|---|---|---|---|---|
| 3,048,011 A | * | 8/1962 | Tumavicus | F02K 9/84 244/3.22 |
| 3,070,329 A | * | 12/1962 | Hasbrouck | F02K 9/84 239/265.35 |
| 3,188,024 A | * | 6/1965 | Schneider | B64C 9/38 239/265.25 |

(Continued)

FOREIGN PATENT DOCUMENTS

| | | |
|---|---|---|
| DE | 1 301 649 B | 8/1969 |
| FR | 2 952 034 A1 | 5/2011 |

(Continued)

OTHER PUBLICATIONS

International Search Report dated Aug. 13, 2014, issued in corresponding International Application No. PCT/FR2014/000089, filed Apr. 22, 2014, 3 pages.

(Continued)

*Primary Examiner* — Lorne E Meade
(74) *Attorney, Agent, or Firm* — Christensen O'Connor Johnson Kindness PLLC

(57) ABSTRACT

A system allowing for the tilting of the rocket motor such that, in the tilted position, the centre of the nozzle is located at least approximately on the neutral orientation axis of said rocket motor.

12 Claims, 4 Drawing Sheets

(56) References Cited

U.S. PATENT DOCUMENTS

| | | | | | |
|---|---|---|---|---|---|
| 3,191,316 | A | * | 6/1965 | Dryden | B64C 29/0041 244/23 A |
| 3,392,918 | A | * | 7/1968 | Goldberg | F02K 9/84 239/265.35 |
| 4,955,559 | A | * | 9/1990 | Kaminskas | B64G 1/26 244/169 |
| 6,282,887 | B1 | * | 9/2001 | Polushin | F02K 9/42 239/127.3 |
| 6,758,437 | B1 | * | 7/2004 | Lane | B64G 1/401 239/265.35 |

FOREIGN PATENT DOCUMENTS

| | | |
|---|---|---|
| JP | H0769300 A | 3/1995 |
| JP | H09240599 A | 9/1997 |

OTHER PUBLICATIONS

Written Opinion of the International Searching Authority dated Aug. 13, 2014, issued in corresponding International Application No. PCT/FR2014/000089, filed Apr. 22, 2014, 6 pages.

International Preliminary Report on Patentability dated Oct. 27, 2015, issued in corresponding International Application No. PCT/FR2014/000089, filed Apr. 22, 2014, 1 page.

* cited by examiner

ORIENTABLE ROCKET-MOTOR SYSTEM

FIELD OF THE DISCLOSURE

Embodiments of the present disclosure relate to an orientable rocket motor system for an airborne vehicle.

Though not exclusively, this disclosure is particularly suitable for being used for a space plane, that is to say an aircraft that is equipped both with aerobic propulsion means such as turboshaft engines and anaerobic propulsion means such as a rocket motor, which is capable of taking off from the ground in the usual manner for an aircraft, of reaching an altitude of at least one hundred kilometers, of flying at a transonic or even supersonic speed, and then of landing also in the usual manner for an aircraft.

BACKGROUND

It is known that a rocket motor comprises a combustion chamber and a nozzle connected by a nozzle neck and that, in order to orient in flight an airborne vehicle equipped with a rocket motor, it is advantageous to control the rocket motor for orientation. To do this, in a known manner, the end of the combustion chamber opposite to the nozzle neck is articulated, for example by means of a universal joint, on the structure of the airborne vehicle, and actuation means, such as actuators, are provided to pivot the rocket motor with respect to this articulated end of the combustion chamber. This way of proceeding has the drawback that, since the orifice for ejecting gases from the nozzle is separated from the articulated end of the combustion chamber by the entire length of the rocket motor, the movement of the orifice for ejecting gases from the nozzle is significant in the transverse direction. Consequently the cowling of the airborne vehicle enclosing the rocket motor must have a large diameter to allow the transverse movement of the orifice for ejecting gases from the nozzle.

The result of this is that this large cowling is the source of high aerodynamic drag which impairs the performance of the airborne vehicle.

SUMMARY

The object of the present disclosure is to remedy these drawbacks.

For this purpose, the orientable rocket motor system for an airborne vehicle, the rocket motor comprising a combustion chamber and a nozzle connected by a neck of the nozzle, and the system making it possible to orient the rocket motor with respect to a reference position defining a reference axis which, when the rocket motor is in the reference position, is orthogonal to the orifice for ejecting gases from the nozzle and passes through the center of the gas-ejection orifice, is distinctive in that it comprises tilting means:

by which the rocket motor is rigidly connected to the nozzle neck by the adjacent part of the nozzle, and which are able to tilt the nozzle and the combustion chamber in opposite directions so that the rocket motor adopts, with respect to the reference position, tilted positions in which the center of the orifice for ejecting gases from the nozzle is situated at least approximately on the reference axis.

Thus, by virtue of the present disclosure, the transverse movement of the orifice for ejecting gas from the nozzle is reduced since the tilting radius thereof is also reduced and since the center of the orifice remains in the vicinity of the reference axis. The cowling of the rocket motor can therefore have a smaller diameter and give rise only to a lower aerodynamic drag.

In an advantageous embodiment, the tilting means comprise a hollow support structure having a truncated pyramid shape:

that is deformable in both directions of a first deformation direction, under the action of first actuation means, which carries the rocket motor by the small base thereof, and inside which the combustion chamber is housed.

Preferably, the hollow deformable support structure is formed by a lattice of articulated bars and the first actuation means are actuators articulated on at least one articulated bar of the lattice.

To allow tilting of the rocket motor in any orientation in space, it is advantageous that the tilting means comprise in addition a hollow base structure, having a truncated pyramid shape:

that is mounted by the large base thereof on the vehicle, that is deformable in both directions of a second deformation direction orthogonal to the first deformation direction, under the action of second actuation means, and that carries the hollow deformable support structure by the small base thereof.

As with the support structure, the hollow deformable base structure may be formed by a lattice of articulated bars and the second actuation means may be actuators articulated on at least one articulated bar of the lattice.

The articulated lattices of the base structure and of the support structure are advantageously placed one above the other in order to form a hollow truncated-pyramid framework for the tilting means. The means may comprise an intermediate frame for assembling the lattices of the base structure and of the support structure, an intermediate frame on which:

the bars of the support structure are articulated about first rotation axes orthogonal to the first deformation direction, and the bars of the base structure are articulated about second rotation axes orthogonal to the second deformation direction.

Preferably, the first actuation means for deformation of the support structure bear on the intermediate frame.

The tilting means may in addition comprise a base frame for assembling the lattice of the base structure on the airborne vehicle, the bars of the lattice of the base structure being articulated on the base frame about such second rotation axes orthogonal to the second deformation direction. Furthermore, it is advantageous that the second actuation means for deformation of the base structure bear on the base frame.

The tilting means may comprise an end plate for attaching the rocket motor to the support structure, the bars of the support structure being articulated on the end plate about such rotation axes orthogonal to the first deformation direction.

Embodiments of the present disclosure also relate to an airborne vehicle, in particular a space plane, comprising an orientable rocket motor system as specified above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
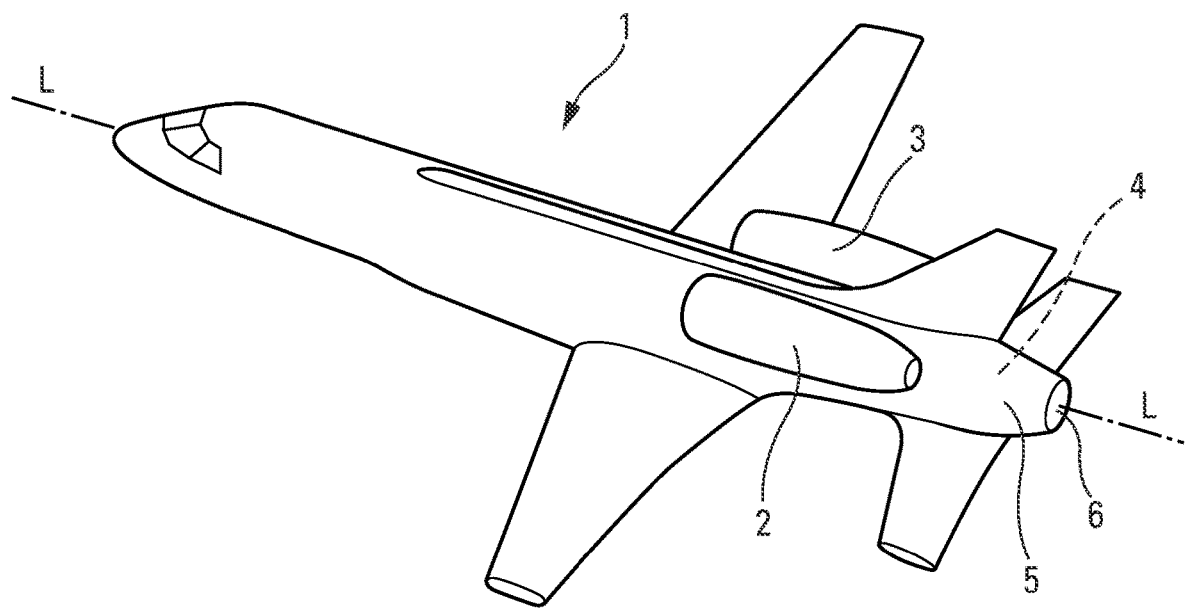
FIG. 1 shows, in perspective, a space plane equipped with an orientable rocket motor according to the present disclosure.
Figure 3:
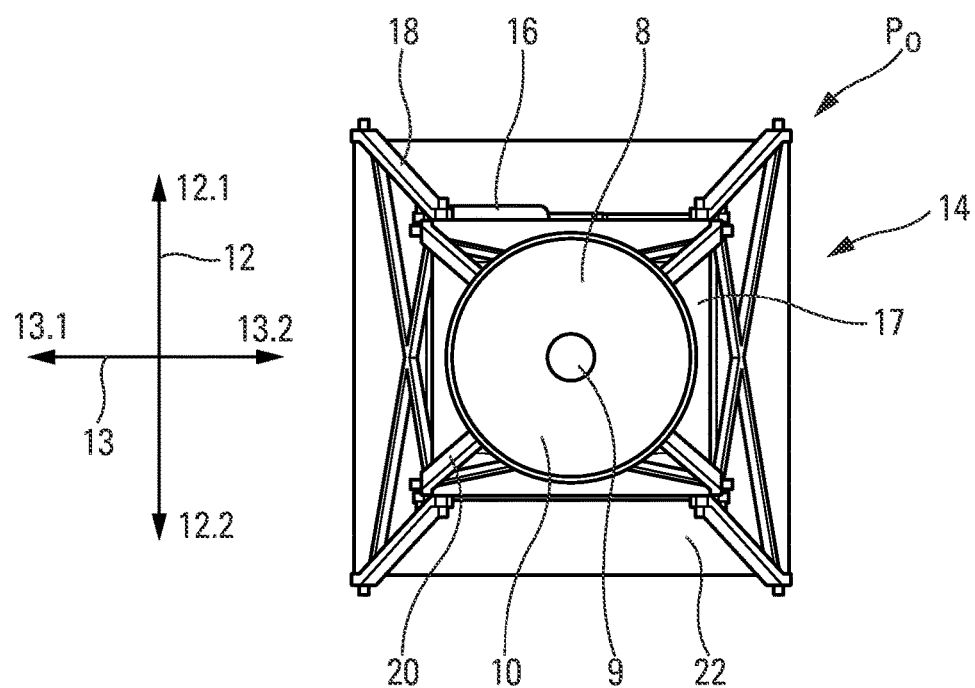
FIG. 3 is a plan view of the tilting means of FIG. 2.
Figure 2:
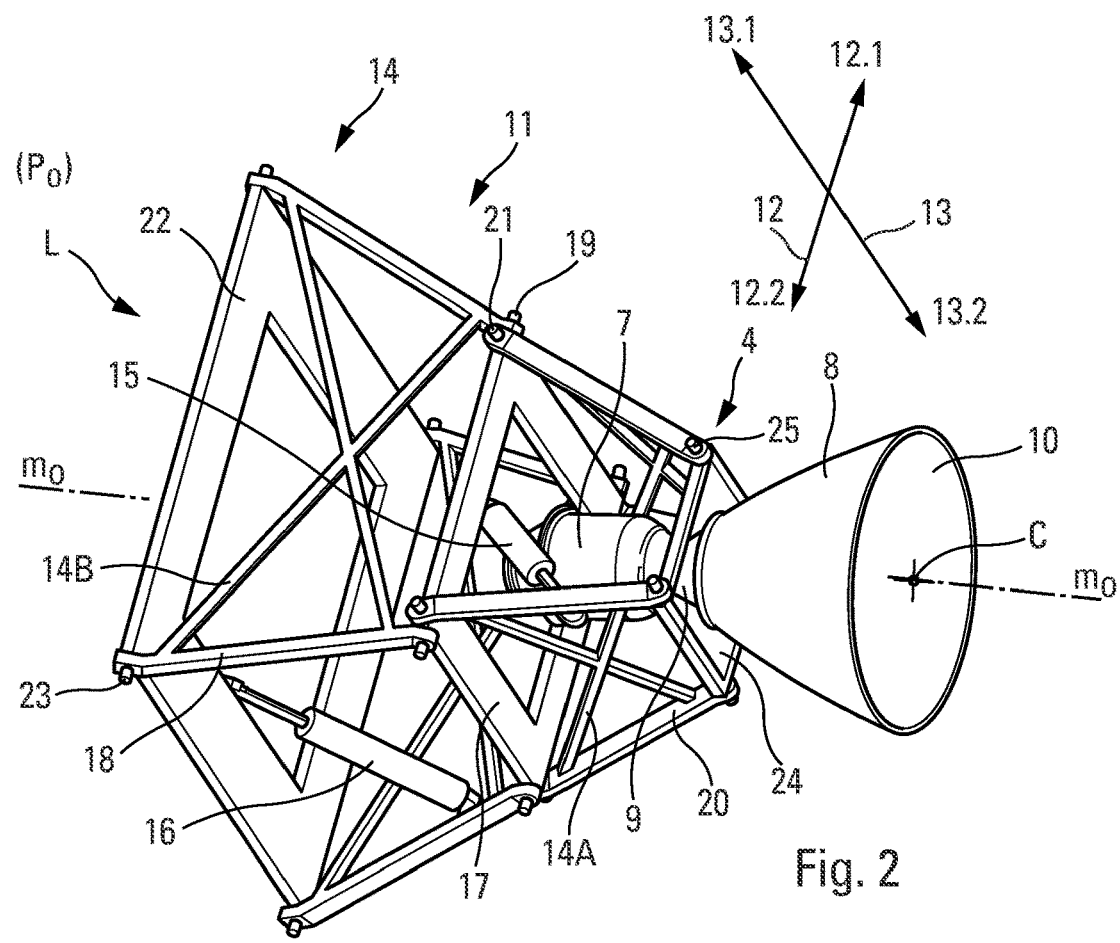
FIG. 2 shows, also in perspective, the means for tilting the rocket motor in accordance with the present disclosure, this rocket motor being in the reference position thereof, neutral in orientation.

The space plane 1, according to the present disclosure and shown in FIG. 1, comprises only one stage and is capable of making transonic and/or supersonic flights.

This space plane 1, having a longitudinal axis L-L, comprises two lateral turboshaft engines 2 and 3 and a rocket motor 4, arranged at the rear of the space plane inside a base cowling 5, provided with a gas-discharge orifice 6. As shown by FIGS. 2 to 8, the rocket motor 4 comprises a combustion chamber 7 and a nozzle 8 connected by a nozzle neck 9. The nozzle 8 comprises a gas-ejection orifice 10 arranged opposite the outlet orifice 6 of the base cowling 5 (shown schematically in dot-and-dash lines in FIGS. 4 to 7).

The rocket motor 4 is mounted (in the base cowling 5) on tilting means 11 capable of deforming in both directions 12.1 and 12.2 and 13.1 and 13.2 of each of the two orthogonal deformation directions 12 and 13. The tilting means 11 comprise, firstly, a truncated pyramid framework 14 in a lattice of articulated bars and, secondly, actuators 15 and 16.

The truncated pyramid framework 14 comprises a supporting truncated pyramid structure 14A carrying the rocket motor 4 by the small base thereof, and a base truncated pyramid structure 14B carrying the supporting truncated pyramid structure 14A by the small base thereof. The large base of the truncated pyramid structure 14A is connected to the small base of the truncated pyramid structure 14B by means of an intermediate frame 17, on which the articulated bars 18 of the base structure 14B are articulated about axes 19 orthogonal to the deformation direction 13 and the articulated bars 20 of the support structure 14A are articulated about axes 21 orthogonal to the deformation direction 12.

The truncated pyramid framework 14 also comprises, on the side of the large base of the structure 14B, a base frame 22 making it possible to connect the framework to the structure of the space plane 1. The articulated bars 18 of the base structure 14B are articulated on the base frame 22 about axes 23 orthogonal to the deformation direction 13. The actuator 16 is articulated both on the base frame 22 on which it bears and on an articulated bar 18, so as to be able to tilt the truncated pyramid structure 14B in both directions 13.1 and 13.2 of the deformation direction 13, by rotation about axes 19 and 23 orthogonal to the deformation direction.

On the small base thereof opposite to the base structure 14B, the support structure 14A carries the rocket motor 4 in a rigidly connected manner. For this purpose, this small base is an end plate 24, to which the rocket motor is rigidly connected by means of the part of the nozzle 8 adjacent to the nozzle neck 9, so that the combustion chamber 7 is situated inside the framework 14. The articulated bars 20 of the support structure 14A are articulated on the end plate 24 about axes 25 orthogonal to the deformation direction 12. The actuator 15 is articulated both on the intermediate frame 17 on which it bears and on an articulated bar 20 so as to be able to tilt the truncated pyramid structure 4A in both directions 12.1 and 12.2 of the deformation direction 12 by rotation about axes 21 and 25 orthogonal to the tilting direction.

Thus, by controlling the actuators 15 and 16, it is possible to orient the rocket motor 4 in space.

In the neutral orientation position $P_o$ serving as a reference position (see FIGS. 2, 4 and 5), the axis of the rocket motor 4 occupies a position $m_o$-$m_o$ that is orthogonal to the gas-ejection orifice 10 of the nozzle 8 and passes through the center C of the orifice. This position $m_o$-$m_o$ serves as a reference axis with respect to which the rocket motor 4 tilts.

Figure 6:
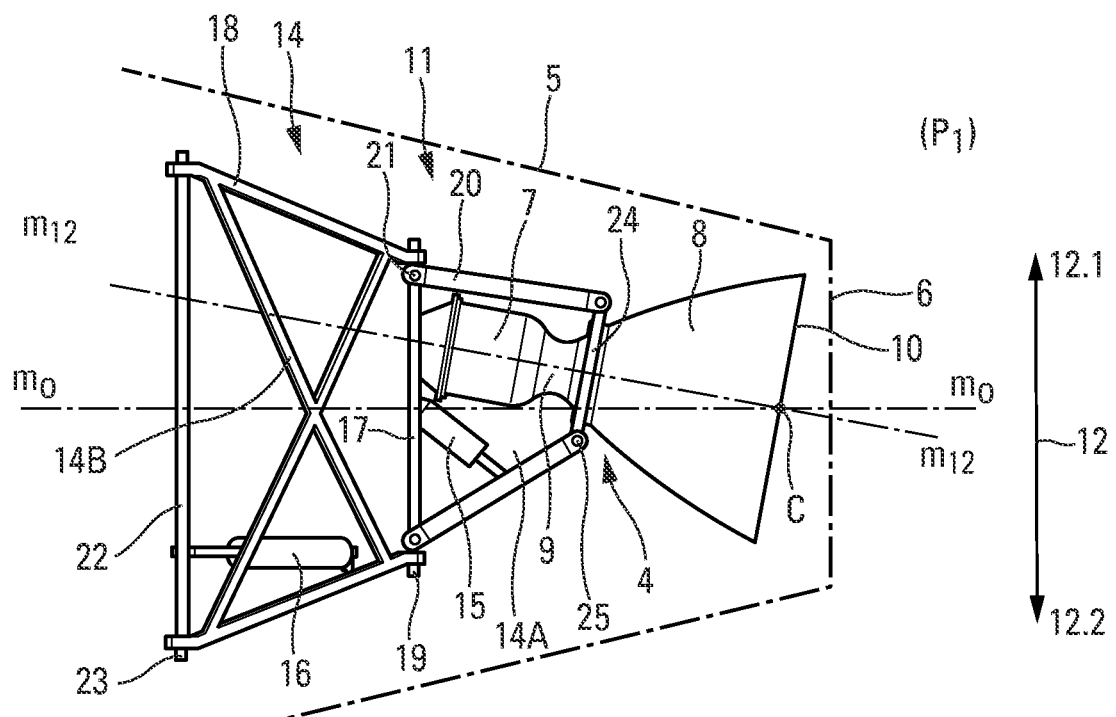
FIG. 6 shows, by comparison with FIG. 4, the tilting of the rocket motor in a first deformation direction.
Figure 5:
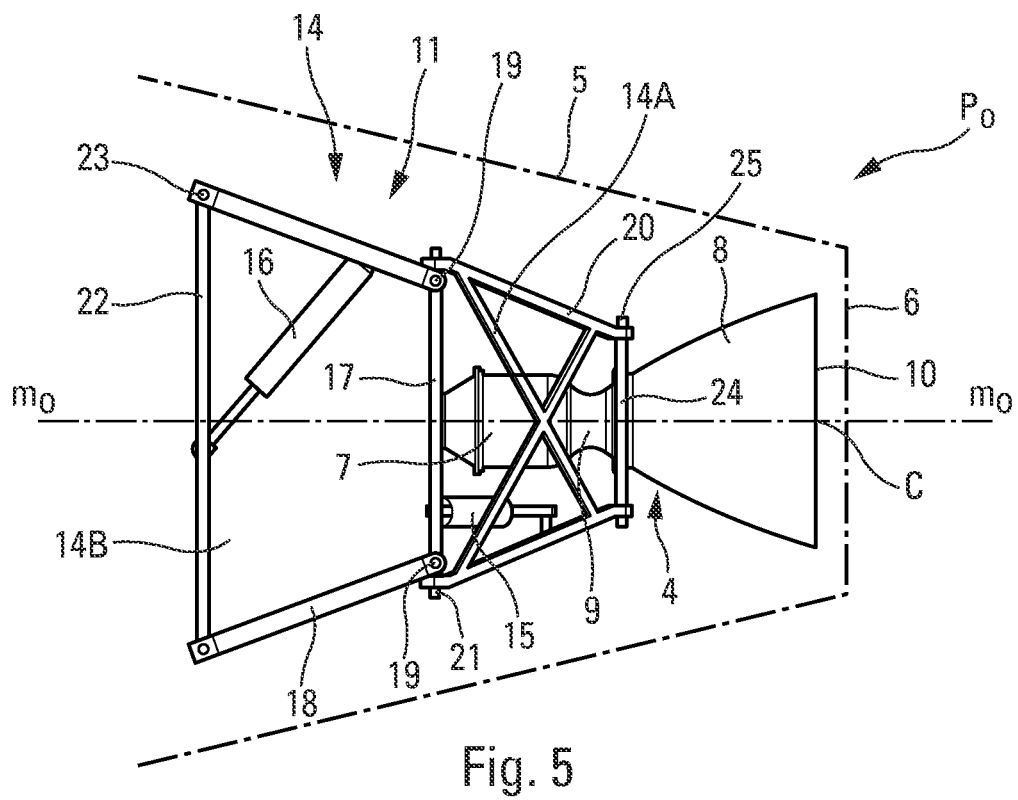
FIG. 5 is a side view from below of the tilting means of FIG. 2.

As shown by FIG. 6, by extending or shortening, the actuator 15 deforms the truncated pyramid support structure 14A in one or the other direction 12.1, 12.2 of the deformation direction 12. Such deformations of the support structure 14A cause the tilting of the end plate 24 so that the rocket motor 4 adopts tilted positions $P_1$ in the directions 12.1, 12.2 of the direction 12, in which the axis thereof adopts positions $m_{12}$-$m_{12}$ inclined with respect to the reference axis $m_o$-$m_o$. In these tilted positions $P_1$, the combustion chamber 7 and the nozzle 8 tilt in opposite directions because the fixed motor 4 is rigidly connected to the end plate 24 by the part of the nozzle 8 adjacent to the nozzle neck 9. By virtue of this fact and the formation of the support structure 14A, the center C of the gas-ejection orifice of the nozzle 10 can, in these positions $P_1$ tilted in the deformation direction 12, remain in the vicinity of the reference axis $m_o$-$m_o$, if not on the axis. The movement of the nozzle 10 in the deformation direction 12 can thus be small.

Figure 7:
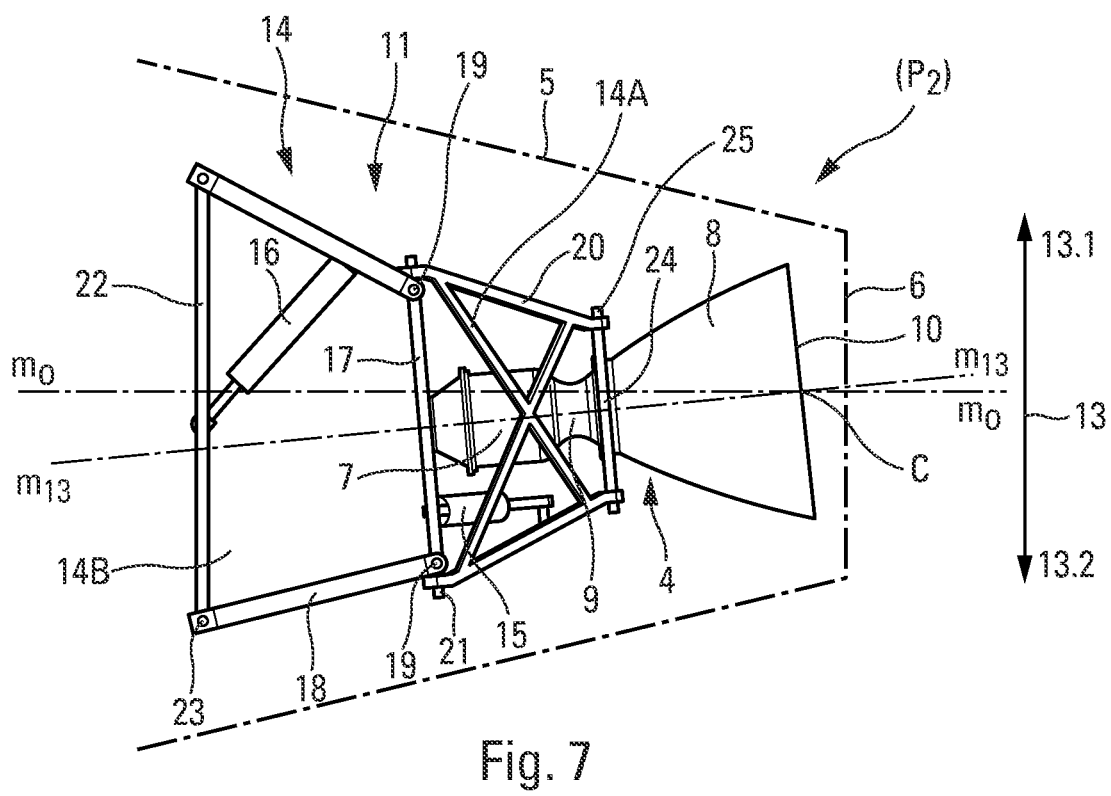
FIG. 7 shows, by comparison with FIG. 5, the tilting of the rocket motor in a second deformation direction orthogonal to the first deformation direction.

In a similar manner, as shown in FIG. 7, by extending or shortening, the actuator 16 deforms the truncated pyramid base structure 14B in one or the other direction 13.1, 13.2 of the deformation direction 13. Such deformations of the base structure 14B cause the tilting of the intermediate plate 17 so that the rocket motor 4 adopts tilted positions $P_2$ in the direction 13.1, 13.2 of the deformation direction 13, in which the axis thereof adopts positions $m_{13}$-$m_{13}$ inclined with respect to the reference axis $m_o$-$m_o$. In these tilted positions $P_2$, the combustion chamber 7 and the nozzle 8 also tilt in opposite directions because the fixed motor 4 is rigidly connected to the end plate 24 by the part of the nozzle 8 adjacent to the nozzle neck 9. By virtue of this fact and the formation of the base structure 14B, the center C of the gas-ejection orifice of the nozzle 10 can, in these positions $P_2$ tilted in the deformation direction 13, remain in the vicinity of the reference axis $m_o$-$m_o$, if not on the axis. The movement of the nozzle 10 in the deformation direction 13 can therefore be small.

Figure 8:
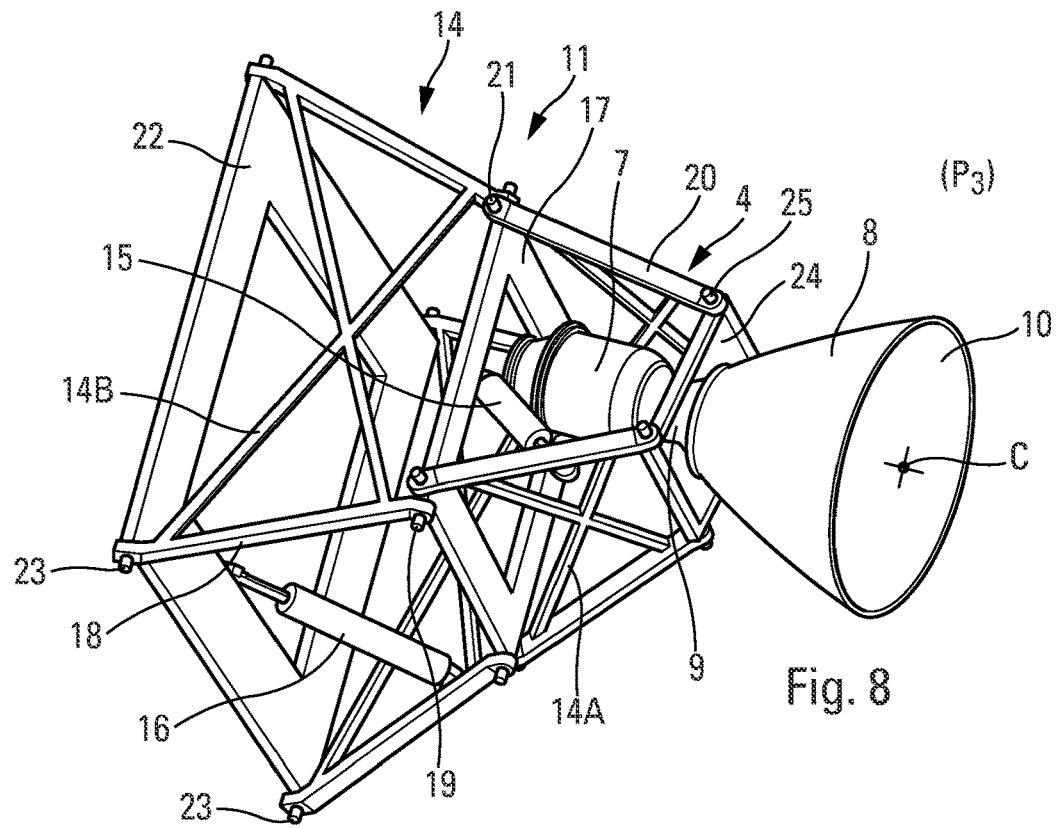
FIG. 8 shows, in comparison with FIG. 2, the combined tilting of the rocket motor resulting from the simultaneous tiltings in the first and second orthogonal deformation directions.
Figure 4:
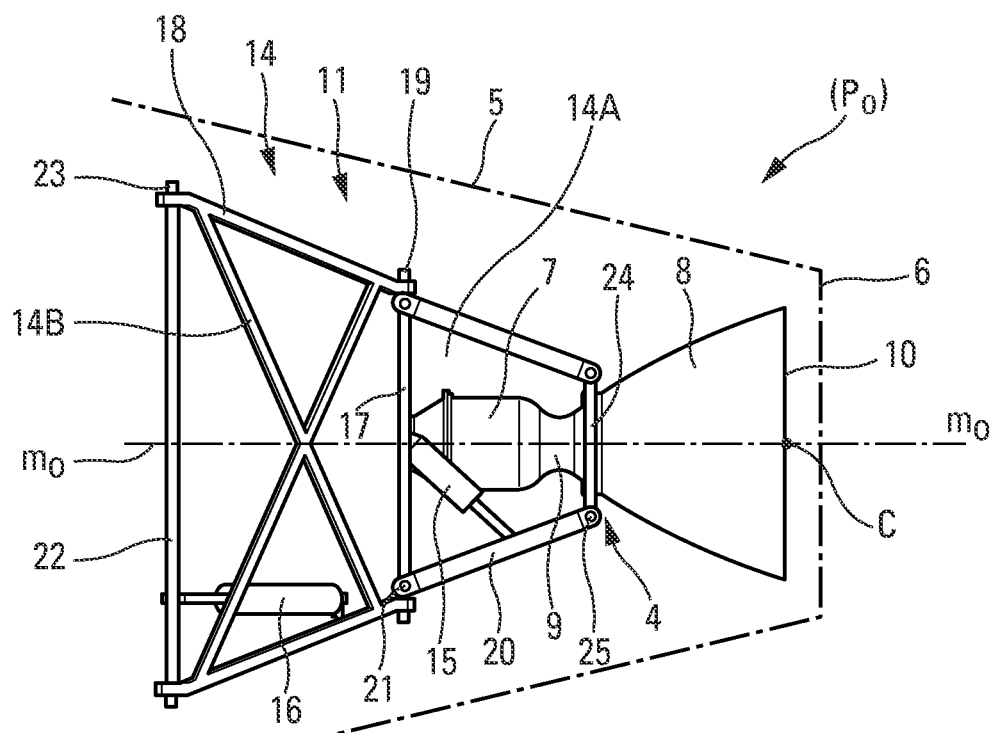
FIG. 4 is a side view from the left of the tilting means of FIG. 2.

Naturally, as shown in FIG. 8, the actuators 15 and 16 can act simultaneously in order to provide the rocket motor 4 with positions $P_3$, tilted both in the deformation direction 12 and in the deformation direction 13.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An orientable rocket motor system for an airborne vehicle, comprising:
a rocket motor comprising a combustion chamber connected by a nozzle neck to a nozzle having a gas-ejection orifice; and
a framework that supports said rocket motor in a reference position defining a reference axis, said reference axis being orthogonal to said gas-ejection orifice of the nozzle and passing through the center of said gas-ejection orifice when said rocket motor is in said reference position,
wherein said framework is coupled to said rocket motor at a part of said nozzle adjacent to said nozzle neck, said framework comprising articulatedly connected support members configured to tilt said rocket motor nozzle and said combustion chamber so that said rocket motor adopts, with respect to said reference position, a number of tilted positions in which the center of said gas-ejection orifice of the nozzle is situated on said reference axis.

2. An airborne vehicle comprising the orientable rocket motor system as recited in claim 1.

3. The orientable rocket motor system according to claim 1, wherein said framework comprises a first support section that includes a plurality of said articulately connected support members arranged in a truncated pyramidal shape that is deformable in both directions of a first deformation direction, under the action of a first actuator, wherein the first support section includes a base that is fixedly coupled to said rocket motor in such an arrangement that said combustion chamber of said rocket motor is housed inside said first support section.

4. The orientable rocket motor system according to claim 3, wherein said first support section is formed by a lattice of articulated bars.

5. The orientable rocket motor system according to claim 3, wherein said framework further comprises a second support section having a truncated pyramidal shape with a first base and a second base that is smaller than the first base, the second support section being mountable on said airborne vehicle by said first base, wherein the second support section is deformable in both directions of a second deformation direction orthogonal to said first deformation direction, under the action of a second actuator, and wherein the second base of the second support section carries said first support section.

6. The orientable rocket motor system according to claim 5, wherein said second support section is formed by a lattice of articulated bars.

7. The orientable rocket motor system according to claim 6, wherein said first support section is formed by a lattice of articulated bars, wherein the lattices of said second support section and of said first support section are placed one above the other in order for said framework to form a hollow, truncated pyramidal structure.

8. The orientable rocket motor system according to claim 6, wherein said framework further includes an intermediate frame for assembling the lattices of said second support section and of said first support section, wherein the lattice of articulated bars of said first support section are articulated on the intermediate frame about first rotation axes orthogonal to said first deformation direction, and wherein the lattice of articulated bars of said second support section are articulated on the intermediate frame about second rotation axes orthogonal to said second deformation direction.

9. The orientable rocket motor system according to claim 8, wherein said first actuator bears on said intermediate frame.

10. The orientable rocket motor system according to claim 9, wherein said framework further comprises a base frame for assembling the lattice of said second support section on the airborne vehicle, the lattice bars of said second support section being articulated on said base frame about second rotation axes orthogonal to said second deformation direction.

11. The orientable rocket motor system according to claim 10, wherein said second actuator bears on said base frame.

12. The orientable rocket motor system according to claim 5, wherein said framework further comprises an end plate for fixedly coupling said rocket motor to said base of said first support section, wherein said first support section includes lattice bars being articulated on said end plate about first rotation axes orthogonal to said first deformation direction.

* * * * *